United States Patent
Saeed et al.

(10) Patent No.: US 11,625,578 B2
(45) Date of Patent: Apr. 11, 2023

(54) NEURAL NETWORK PROCESSING

(71) Applicants: Arm Limited, Cambridge (GB); Apical Limited, Cambridge (GB)

(72) Inventors: Sharjeel Saeed, Cambridge (GB); Aaron DeBattista, Cambridge (GB); Daren Croxford, Cambridge (GB)

(73) Assignee: ARM Limited, Cambridge (GB)

( * ) Notice: Subject to any disclaimer, the term of this patent is extended or adjusted under 35 U.S.C. 154(b) by 363 days.

(21) Appl. No.: 16/834,881

(22) Filed: Mar. 30, 2020

(65) Prior Publication Data

US 2021/0303974 A1     Sep. 30, 2021

(51) Int. Cl.
  *G06N 3/04*  (2006.01)
  *G06K 9/62*  (2022.01)
  *G06N 3/08*  (2023.01)

(52) U.S. Cl.
  CPC .......... *G06N 3/0472* (2013.01); *G06K 9/6261* (2013.01); *G06N 3/08* (2013.01)

(58) Field of Classification Search
  CPC ...... G06N 3/0472; G06N 3/08; G06N 3/0454; G06K 9/6261; G06V 10/82; G06V 10/94
  See application file for complete search history.

(56) References Cited

U.S. PATENT DOCUMENTS

| | | | |
|---|---|---|---|
| 2016/0239528 A1* | 8/2016 | Pemberton | G06F 16/211 |
| 2020/0050555 A1* | 2/2020 | Kim | G06F 12/126 |
| 2021/0019633 A1* | 1/2021 | Venkatesh | G06F 5/01 |

FOREIGN PATENT DOCUMENTS

CN     110532900    *   8/2019

OTHER PUBLICATIONS

Machine translation for CN 110532900 (Year: 2019).*

* cited by examiner

*Primary Examiner* — Qian Yang
(74) *Attorney, Agent, or Firm* — EIP US LLP

(57) ABSTRACT

A method apparatus and computer readable medium for processing input data using a neural network comprising at least a first layer and a second layer. The method comprising the steps of applying a partitioning scheme to the input data, to partition the input data into a plurality of blocks, each block representing a portion of the input data. At the first layer of the neural network, the blocks of the input data are processed in a first order to generate intermediary data, wherein the intermediary data is partitioned into a plurality of intermediary blocks. At the second layer of the neural network, the intermediary blocks are processed in a second order, wherein the second order differs from the first order.

16 Claims, 3 Drawing Sheets

NEURAL NETWORK PROCESSING

BACKGROUND OF THE INVENTION

Field of the Invention

The present disclosure relates to methods, apparatus and a computer-readable storage medium for processing input data using a neural network.

Description of the Related Technology

Processors used to implement convolutional neural networks, such as neural processing units (NPUs), central processing units (CPUs), graphical processing units (GPUs), digital signal processors (DSPs), and coprocessors, have onboard memory, usually in the form of static random-access memory (SRAM). When implementing convolutional neural networks using such processors, it may not be possible for all of the data including, for example, the input data, the output data, and data corresponding to the operations involved in the neural network, which may be a convolutional neural network, to be maintained on the processor's memory. At least some of the data may be stored in memory which is external to the processor, this may include both volatile and non-volatile memory. The processor may access the external memory when executing the neural network. The neural network may comprise a plurality of layers, such as a convolutional neural network. Each layer generates an output, this output is then used as an input to the next layer. These outputs may be stored in memory. Therefore, it is desirable to increase the efficiency of memory accesses when implementing neural networks which have a plurality of layers.

SUMMARY

According to a first aspect of the present disclosure, there is provided a method for processing input data using a neural network comprising at least a first layer and a second layer, the method comprising the steps of applying a partitioning scheme to the input data, to partition the input data into a plurality of blocks, each block representing a portion of the input data; processing, at the first layer of the neural network, the blocks of the input data in a first order to generate intermediary data, wherein the intermediary data is partitioned into a plurality of intermediary blocks; and processing, at the second layer of the neural network, the intermediary blocks in a second order, wherein the second order differs from the first order.

According to a second aspect of the present disclosure, there is provided an apparatus for processing input data using a neural network comprising at least a first layer and a second layer, the apparatus comprising at least one processor for implementing at least the neural network on input data; and processor storage accessible by the at least one processor, wherein the apparatus is configured to apply a partitioning scheme to the input data, such that the input data is partitioned into a plurality of blocks, each blocks representing a portion of input data; process, at the first layer of the neural network, the blocks of the input data in a first order to generate intermediary data, wherein the intermediary data is partitioned into a plurality of intermediary blocks, wherein at least one of the intermediary blocks is stored within the processor storage; and process, at a second layer of the neural network, the intermediary blocks in a second order, wherein the second order differs from the first order.

According to a third aspect of the present disclosure, there is provided a non-transitory computer-readable storage medium comprising a set of computer-readable instructions stored thereon, which when executed by at least one processor, cause the at least one processor to apply a partitioning scheme to the input data, to partition the input data into a plurality of blocks, each block representing a portion of the input data; process, at the first layer of the neural network, the blocks of the input data in a first order to generate intermediary data, wherein the intermediary data is partitioned into a plurality of intermediary blocks; and process, at the second layer of the neural network, the intermediary blocks in a second order, wherein the second order differs from the first order.

BRIEF DESCRIPTION OF THE DRAWINGS

Further features and advantages will become apparent from the following description of preferred embodiments, given by way of example only, which is made with reference to the accompanying drawings in which like reference numerals are used to denote like features.

DETAILED DESCRIPTION OF CERTAIN INVENTIVE EMBODIMENTS

Figure 1:
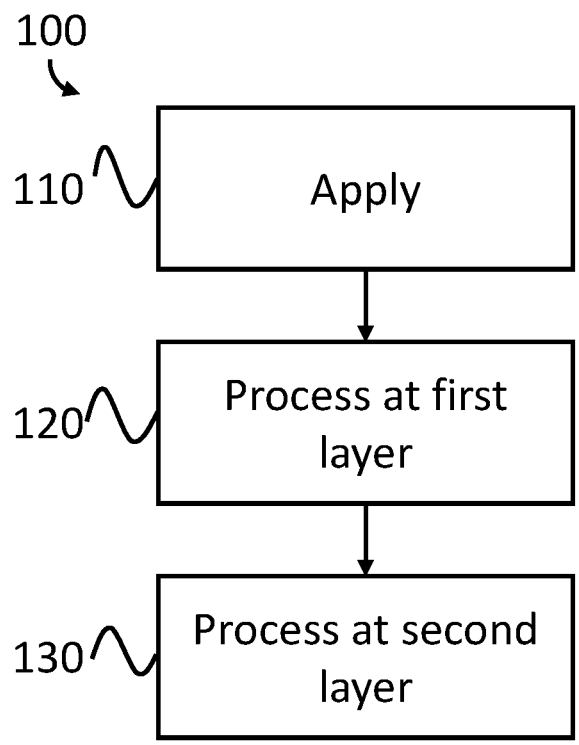
FIG. 1 is a flow chart of a method for processing input data in multiple layers of a neural network according to an example.

Details of methods and apparatus according to examples will become apparent from the following description with reference to the Figures. In this description for the purposes of explanation, numerous specific details of certain examples are set forth. Reference in the specification to 'an example' or similar language means that a feature, structure, or characteristic described in connection with the example is included in at least that one example but not necessarily in other examples. It should be further notes that certain examples are described schematically with certain features omitted and/or necessarily simplified for the ease of explanation and understanding of the concepts underlying the examples.

Certain examples described herein provide a method for processing input data using a neural network split into layers. When implementing at least one layer of a convolutional neural, such as a convolution and/or deconvolution layer, network memory access may be performed for a variety of data. Convolution layers read input data as an input feature map (IFM) and output processed data as an output feature map (OFM). Examples described herein may apply to accessing portions of memory when reading and/or writing input data, output data, data relating to the convolutional neural network such as data representing weights of kernels in at least one layer of the convolutional neural network, and/or bias data. Input data may relate to data input to a first layer of the convolutional neural network and data which is input to each subsequent layer of the convolutional neural network. Input data may include sensor data derived from one or more sensors such as image sensors, sound sensors, and other suitable forms of sensor data as described below. Input data may also include input feature maps, generated from performing operations on sensor data. In some examples, data input to a first layer of a convolutional neural network maybe sensor data and data input to subsequent layers of the convolutional neural network may be referred to as input feature maps. Output data may relate to data output from a last layer of the convolutional neural network and data which is output when performing convolutions at each intermediate layer. Data which is output when implementing a convolutional layer on an IFM or input data from a sensor may be referred to as one or more OFM. The data may be compressed or uncompressed.

The neural network receives input data and weights, such as in the form of an input feature map for a convolutional neural network layer, and each layer of the neural network outputs output data, such as an output feature map for a convolutional neural network layer. The output data of each layer is then provided as an input into the next layer for further processing. In some examples, the entirety of each layer's output will fit within the on-chip buffer of a processor, such as a neural processing unit (NPU), central processing unit (CPU) or graphics processing unit (GPU). However, in other examples, the capacity of the on-chip buffer may not be capable of storing all the output data of the layer. In such examples, there are several options for overcoming this limitation. First, the output data may be compressed, however, this then requires decompression in the subsequent layer before it can be processed, alternatively, the second option is for the output data, or portions of it may be written to external, or off-chip, memory and read back by the subsequent layer. Both these options reduce the efficiency of processing by requiring compression and decompression to be undertaken, and/or by increasing the number of memory read/writes to/from external, off-chip memory. Examples described herein aim to resolve this problem by adjusting the processing order to reduce the number of memory read/writes to/from external, off-chip memory.

FIG. 1 is a flow chart of a method 100 for processing input data using multiple layers of a neural network, such as a convolutional neural network. At block 110, a partitioning scheme is applied to the input data. The partitioning scheme splits the input data into a plurality of blocks, such that each block is representative of a portion of the input data. The partitioning scheme may vary from layer to layer and can be based on an optimal storage size. The optimal storage size may be associated with the size of an internal buffer of the processor. For example, the partitioning scheme is arranged to partition the input data such that each block of input data is the same size as, or smaller than, the internal buffer such that the internal buffer stores the most recently processed block, before subsequently writing the block to external storage. In other examples, the partitioning scheme partitions the input data into multiple smaller blocks which require less memory than the internal buffer size, such that multiple blocks can be stored in the internal buffer at once.

In some examples, the optimal block size can be determined. The optimal block size may be based on several factors including an analysis of the size of the input data and the size of the buffer, such that the partitioning scheme is arranged to ensure the minimum number of read/write operations required during the processing of the input data.

Once the partitioning scheme has been determined and the input data partitioned into a plurality of blocks, the method progresses to block 120 where the input data is processed using a first layer of the neural network in a first order. The first layer of the neural network may comprise a first set of fused layers. The first layer of the neural network is arranged to process the input data in a stream, processing a first block, storing the processed block as intermediary data in the internal memory of the storage, and then processing a second block. If the buffer can store multiple blocks of intermediary data, then the second intermediary block corresponding the processed second block is also added to the buffer. If the buffer does not have a sufficient size to store multiple blocks, then the first intermediary block is written to external storage, and the second intermediary block is stored in the buffer. The first layer will process the blocks in a first order, which as will be explained in further detail with reference to FIG. 3 may comprise processing an upper left block first, and then processing the block immediately to the right, before performing the same steps for subsequent rows of the input data.

Similarly, if the buffer can store multiple blocks, and is currently full, then upon processing the next block, the oldest block is written to external storage to provide enough space within the buffer to store the most recently processed block. As such, when processing the blocks of input data, the intermediary data representing the processed blocks are stored in the buffer in a first in, first out method such that the most recently processed data is available in the buffer, and older data is relegated to external storage.

Once the input data has been processed at the first layer, and intermediary blocks of the intermediary data are stored in the buffer and/or external storage, the method progresses to block 130. The intermediary blocks may have the same or similar characteristics as the blocks of input data, such as the same size. The second layer of the neural network may comprise a second set of fused layers. The second layer of the neural network obtains the intermediary blocks and processes them in a second order. The second order may be the inverse of the first order, such that the last block of intermediary data is processed first. By processing the intermediary blocks in an order which is the inverse of the order they were output by the first layer in, the blocks which are stored in the buffer first before obtaining further intermediary blocks from external storage. It will be appreciated that the first and second order may not necessarily be the inverse, however, they may be arranged such that when processing data in the second order, the last block or blocks which were output by the first layer are processed first.

By processing the intermediary blocks at the second layer in a different order than the blocks processed at the first layer, efficiencies may be gained by reducing the number of memory read/write requests sent to the external memory.

In some examples, it will be appreciated that the neural network will have more than two layers, and as such, processing the processed block in an order different from the previous layer may be used to obtain further efficiencies in such neural networks. As such, the method of processing input data may be applied to neural networks with more than two layers.

In yet further examples, once the intermediary data has been generated the blocks of intermediary data stored in the buffer and the external storage may be adjusted by applying an intermediary portioning scheme to adjust the characteristics of the intermediary blocks, such as revising the size of the intermediary blocks. This enables the intermediary blocks to be processed more efficiently by subsequent layers. Since layers do not process input data of the same size, for example, the previous layer may have been a pooling layer of a convolution neural network, it may be desirable to determine updated blocks to more efficiently process the data in subsequent layers. Again, the intermediary partitioning scheme may be based on the buffer size to optimize the number of blocks which can be readily accessed from the buffer.

Figure 2:
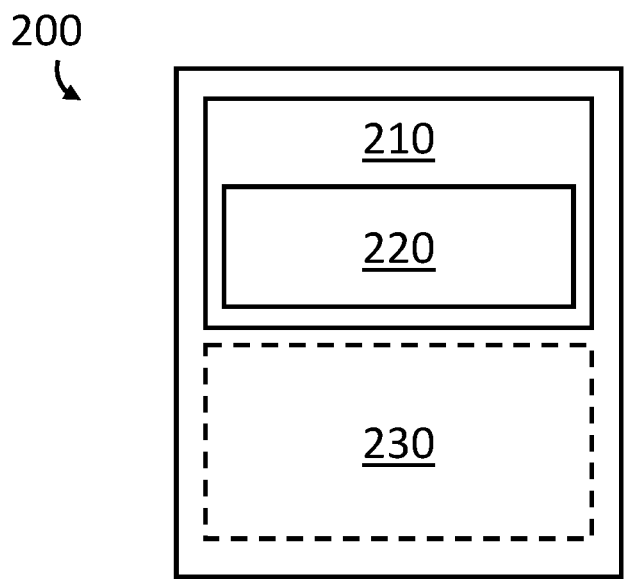
FIG. 2 is a schematic diagram of an apparatus according to an example.

FIG. 2 is a schematic diagram of apparatus 200 according to an example. The apparatus 200 may be comprised in a computing device. For example, the apparatus 200 may be part of a handheld computing device such as a smartphone, tablet device, laptop, desktop computer and/or server. In such examples, the apparatus 200 may be used to implement a neural network, such as a convolutional neural network, or at least one layer of a neural network, on data obtained by the smart telephone or tablet device. Data which can be obtained by a smart telephone or tablet device depends on the functionality of the device and sensors which are comprised in the device. This data may include image data, audio data, telemetry data, accelerometer data, global positioning system data, magnetometer data, light sensor data, fingerprint reader data, any other data which may be collected by a local sensor comprised in or on the computing device, or any data receivable over a local or wide area network through wired or wireless communication interfaces comprised in the computing device. Alternatively, the apparatus 100 may be used in another type of computing device, for example, a computing device used in an autonomous vehicle, or in a robotics application where the convolutional neural network is used to process control data, sensory feedback data, or to provide any other suitable information processing.

The apparatus 200 comprises at least one processor 210. The at least one processor 210 comprises processor storage 220, such as a buffer. The processor storage 220 is arranged to store at least the outputs of the layers of the neural network, such that the outputs are readily accessible to the subsequent layers of the neural network. That is, as described above the processor storage 210 is arranged to store at least one of the intermediary block's output by a first layer of the neural network, such that subsequent layers can easily and efficiently access the output and use at least a portion of it as an input for further processing. The processor storage 220 may be of any suitable form including on-chip memory and volatile memory, such as random-access memory. The processor storage 220 may also be referred to as a cache and maybe under the control of a memory management unit (MMU), or memory protection unit (MPU). In other examples, the processor storage 220 may be separate from the MMU but may communicate therewith. In certain examples, the processor storage 220 is a dedicated buffer which serves the at least processor 210, providing storage specifically for use in storing intermediary blocks output by one or more layers of the neural network executed on the processor 210

The at least one processor 210 may include a neural processing unit (NPU) which may also be called an AI accelerator or a neural network processing unit. In other examples, the at least one processor 110 may include another form of processor which has been configured to implement at least one layer of a convolutional neural network. For example, the at least one processor 210 may include a CPU, a GPU, a DSP, a coprocessor, or any other suitable processor.

The apparatus 200 may also comprise or may be part of a device which also comprises, further processors (not shown) and storage 230 where the storage 220 serves the at least one processor 210 and not the further processors. The optional further storage 230 may be secondary storage which is used to store further intermediary blocks when the processor storage 220 is full. The secondary storage 230 may have a greater storage capacity than the processor storage 220 of the processor 210. In some examples, the secondary storage 230 may comprise a magnetic or optical disk, a disk drive, a solid-state drive (SSD), or non-volatile RAM (NVRAM). In some examples, the storage 230 comprises a synchronous dynamic random-access memory (SDRAM). For example, the storage 230 may comprise a double data rate synchronous dynamic random-access memory (DDR-SDRAM).

Figure 3:
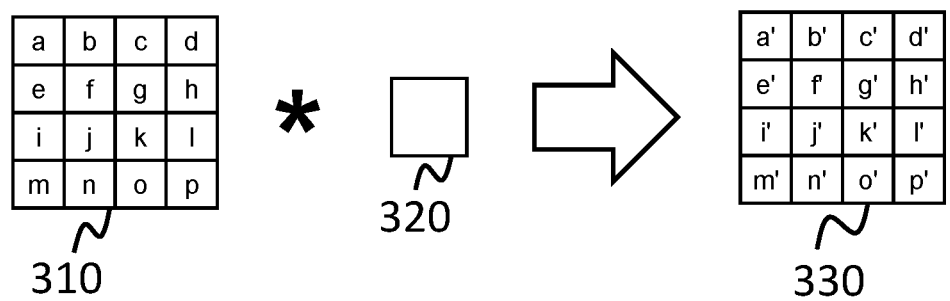
FIG. 3 is a schematic diagram illustrating an implementation of a single layer of a simplified neural network, according to an example.

FIG. 3 shows input data 310 which has been partitioned into a plurality of blocks 310a . . . 310p using a partitioning scheme arranged to generate optimally sized block based on the size of a buffer associated with the processor. For example, the input data 310 may be image data comprising a plurality of pixel intensity values representing a plurality of pixel locations. Each block may represent a predetermined area of the image data. A convolutional neural network may comprise at least one filters 320 representing a kernel. In some examples, there may be a plurality of kernels each being configured to extract a given feature from the input data 310. Often input data and/or an IFM may comprise multiple channels, and as such, the kernel will be a three-dimensional kernel. For example, a kernel may be used to extract features from input data comprising three color channels. As such, a kernel may be represented as a matrix having a size 3 wide, by 3 high, by three deep, that is each depth layer may represent a respective color channel (red, green blue). The filters 320 may be used to process the input data 310 to detect features in the image. When implementing the layer of the convolutional neural network, the filter 310 processes a first block of the part 310a of the input data 310. After processing the first block, the filter 320 is shifted to a second portion 310b of the input data 310 and the process is repeated. The increment with which the filter 320 is shifted may be referred to as the stride. Performing this process until the filter 320 has been applied to all the input data 310, according to its size and stride, will result in intermediary data 330 also comprising a plurality of blocks 330a' . . . 310p'. The intermediary data 330 may be further processed or modified by a second layer of the neural network where further filters are applied to the intermediary data 330 to generate output data. This process may be repeated any number of times depending on the number of layers of the neural network.

Figure 4:
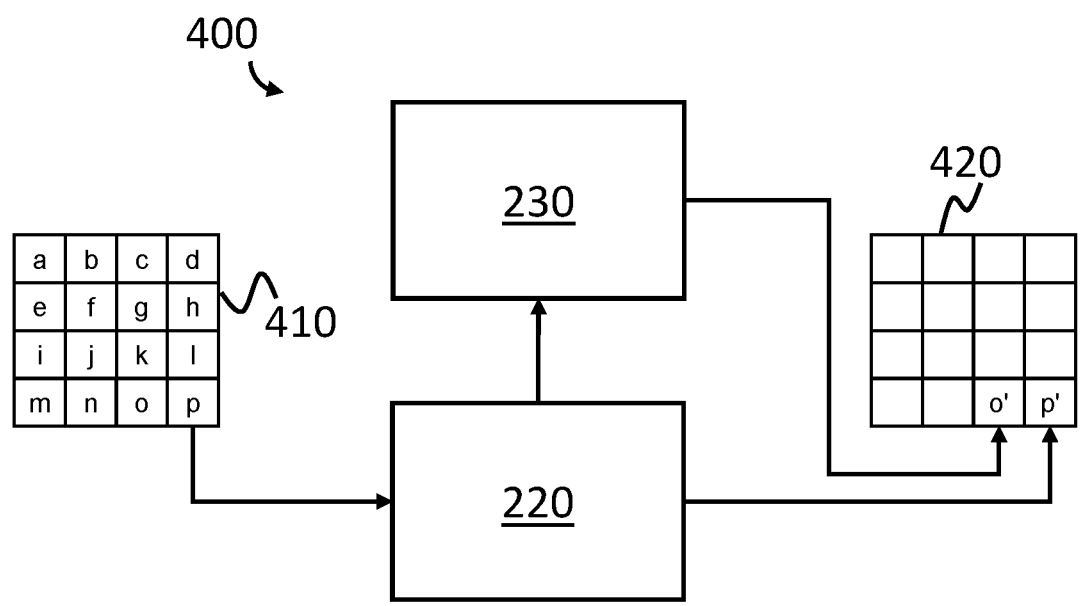
FIG. 4 is a schematic diagram illustrating the storage of processed blocks of data according to an example.

FIG. 4 shows schematically the method of storing blocks of intermediary data from a first layer and using it as an input when processing a second layer. Input data 410 is received by a processor, such as a processor 210 of apparatus 200. The input data is partitioned into a plurality of blocks a . . . p using a partitioning scheme optimized for the size of processor storage 220, such as the buffer of a processor 210. As the processor 210 processes, each block of it is placed into the buffer 220. When the buffer 220 has no further space for additional processed blocks, the oldest block is transferred to external storage 230. In this example, the blocks of input data 410 are processed in alphabetical order, such that block a is processed first, followed by block b. The processor storage 220 may be sized such that it can store a single block of data, or multiple blocks of data such as block a-d.

In the example where the buffer can store only a single block of data, block a will be processed first, and placed in the processor storage 220, block b will then be processed. Since there is no space in the processor storage 220 for block b, block a will be written to external memory 230 and block b added to the processor storage 220. This process will repeat until all blocks of the input data 410 have been processed. As such the processor storage 220 holds data in a first in first out manner.

When the second layer of the neural network begins to process the intermediary data stored in the processor storage 220, and in some examples the external storage 230, it reads the data from the processor storage first, as indicated by block p, and then proceeds to read blocks, such as block o from external storage. Accordingly, the second layer of the neural network processes the intermediary blocks a' ... o' in reverse alphabetical order to produce output data 420. It will be appreciated that other orderings may be used depending on the partitioning scheme used and the size of the processor storage. In yet further examples, the intermediary data may be repartitioned to further improve efficiency, so that the last block or blocks that are in the processor storage are preferentially accessed first when processing the next layer.

In some examples, the size of the input data and the size of the buffer may mean that different numbers of blocks can be stored in the processor storage 220, and as such, the number of blocks which can be processed by each layer may vary.

Figure 5:
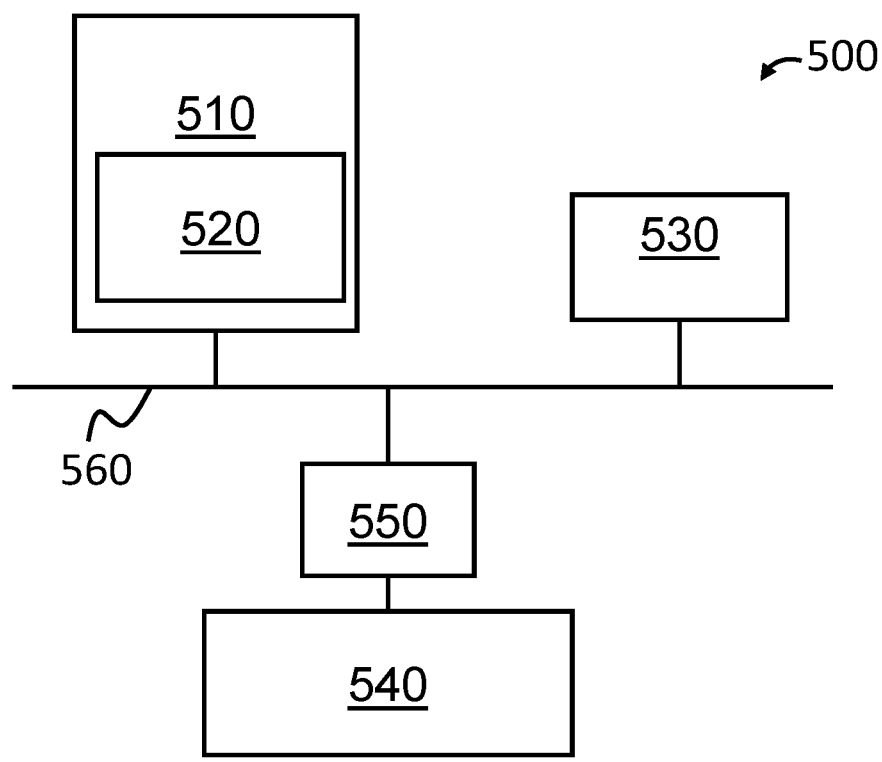
FIG. 5 is a schematic diagram of a system comprising features according to examples.

FIG. 5 is a simplified schematic diagram of an implementation of a system 500 illustrating features of the present disclosure. FIG. 5 shows a processor 510 for implementing at least a layer of a neural network, such as a convolutional neural network. The processor 510 has processor storage 520, such as a buffer, for storing intermediary data produces as an output of a layer of the neural network. The system 500 also comprises external storage 540 that may be larger than the processor storage 520 and may store a larger number of blocks of intermediary data. For example, the storage 540 stores blocks of intermediary data processed first, that is, as described above the blocks of intermediary data are first stored in the processor storage 520 before being removed and written to external storage 540 in a first in first out manner. In some examples, the external storage 540 may serve multiple other processors 530, which may or may not be executing neural networks on other input data. Using the processor storage 520 first enables subsequent layers of the neural network to access information quickly and efficiently, and by processing the blocks in different orders, such as an inverse order, the blocks of intermediary data which are left within the processor storage 520 when the first layer has processed the input data can be read back first without the need to issue read requests to the external storage. A memory access controller 550 is provided which is connected to memory 540. The memory access controller 550 may comprise a dynamic memory controller (DMC). The memory controller 550 is configured to manage the flow of data going to and from the memory 540.

The processor 510 may be any suitable processor such as an NPU, CPU or GPU. The external storage 540 may have a greater storage capacity than the processor storage 520 of the processor 510. In some examples, the external storage 540 is comprised in the apparatus 200. For example, the external storage 540 may comprise 'off-chip' memory. The external storage 540 may, for example, comprise a magnetic or optical disk and disk drive or a solid-state drive (SSD) or non-volatile RAM (NVRAM). In some examples, the external storage 540 comprises a synchronous dynamic random-access memory (SDRAM). For example, the external storage 540 may comprise a double data rate synchronous dynamic random-access memory (DDR-SDRAM).

One or more of the processor 510, and the memory controller 540, the other processors 530, as well as other components (not shown), may be interconnected, for example using system bus 560, although it will be appreciated that the processor 510 and at least one of the other components 530, 540 of the system 500 may be directly connected to one another such that the output of one component is connected directly to the input of another component in a pipeline. This allows data to be transferred between the various components. The system bus 560 may be or include any suitable interface or bus. For example, an ARM® Advanced Microcontroller Bus Architecture (AMBA®) interface, such as the Advanced eXtensible Interface (AXI), may be used.

Figure 6:
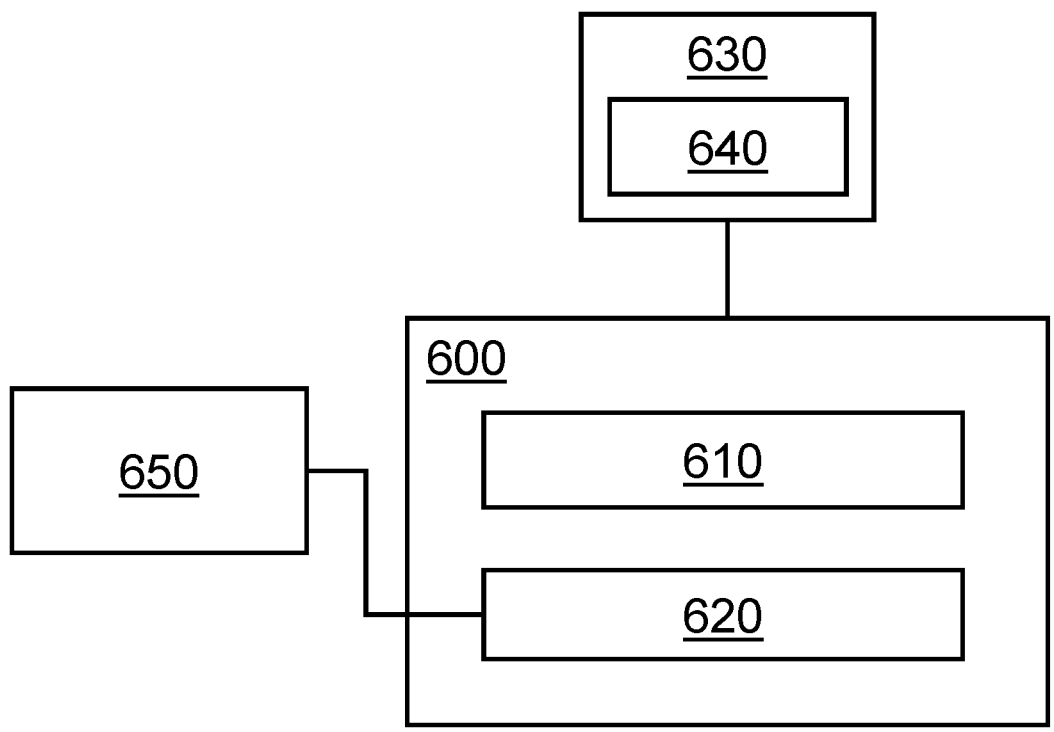
FIG. 6 is a schematic diagram of a non-transitory computer-readable storage medium according to an example.

FIG. 6 shows a non-transitory computer-readable storage medium 600 according to an example. The non-transitory computer-readable storage medium 600 comprises computer-readable instructions shown in blocks 610 and 620. The instructions at block 610 when executed by a processor 630, cause the processor 630 at least to, predict and determine a partitioning scheme for partitioning input data in accordance with the size of the input data and the size of processor storage 640 of the processor 630. The instructions at block 620, when executed by the processor 630, cause the processor at least to, in response to apply the partitioning scheme and process the input data at the first layer of the convolutional neural network, such that the output of the first layer, the intermediary data, is stored in blocks both in the processor storage 640 and external storage 650.

It will be appreciated that the examples described herein may also be used where the input data and/or the output data are compressed. Some methods of compression of data are deterministic and hence can be factored into a prediction of an access procedure. In such cases, the memory address translations which are obtained and stored may correspond to the starting address of compressed blocks which are to be read or written out.

The above examples are to be understood as illustrative examples of the present disclosure. Further examples are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the disclosure, which is defined in the accompanying claims.

What is claimed is:

1. A method for processing input data using a neural network comprising at least a first layer and a second layer, the method comprising the steps of:
    applying a partitioning scheme to the input data, to partition the input data into a plurality of blocks, each block representing a portion of the input data;
    processing, at the first layer of the neural network, the blocks of the input data in a first order to generate intermediary data, wherein the intermediary data is partitioned into a plurality of intermediary blocks by applying an intermediary partitioning scheme to the intermediary data, such that the intermediary data is partitioned into a plurality of intermediary blocks in accordance with the intermediary partitioning scheme, and wherein the intermediary partitioning scheme is based on an optimal intermediary block size; and
    processing, at the second layer of the neural network, the intermediary blocks in a second order, wherein the second order is the inverse of the first order.

2. The method of claim 1, wherein at least a last block written to a memory in the first order is equivalent to at least a first block read from memory in the second order.

3. The method of claim 1, wherein processing at the first layer comprises writing each of the plurality of intermediary blocks to at least a first memory or a second memory.

4. The method of claim 3, wherein the intermediary blocks written to the second memory correspond to blocks processed last in accordance with first order.

5. The method of claim 3, wherein the first memory is external storage and the second memory is processor storage associated with a processor arranged to execute the method.

6. The method of claim 3, wherein the partitioning scheme determines an optimal block size based on the size of the second storage.

7. The method of claim 6, wherein applying the partitioning scheme to the input data comprises adjusting a size associated with each of the plurality of blocks based on the optimal block size.

8. The method of claim 1, wherein characteristics of the plurality of intermediary blocks correspond to characteristics of the plurality of blocks of the input data.

9. The method of claim 1, wherein the neural network is a convolutional neural network, and the input data is input feature map data or at least one input probability.

10. The method of claim 1, wherein processing, at the second layer comprises generating output data, wherein the output data is at least one of an output feature map, or at least one output probability.

11. The method of claim 1, wherein the first layer comprises a first fused set of layers, or the second layer comprises a second fused set of layers.

12. An apparatus for processing input data using a neural network comprising at least a first layer and a second layer, the apparatus comprising:
at least one processor for implementing at least the neural network on input data; and
processor storage accessible by the at least one processor, wherein the apparatus is configured to:
apply a partitioning scheme to the input data, such that the input data is partitioned into a plurality of blocks, each block representing a portion of input data;
process, at the first layer of the neural network, the blocks of the input data in a first order to generate intermediary data, wherein the intermediary data is partitioned into a plurality of intermediary blocks by applying an intermediary partitioning scheme to the intermediary data, such that the intermediary data is partitioned into a plurality of intermediary blocks in accordance with the intermediary partitioning scheme, and wherein the intermediary partitioning scheme is based on an optimal intermediary block size, wherein at least one of the intermediary blocks is stored within the processor storage; and
process, at a second layer of the neural network, the intermediary blocks in a second order, wherein the second order is the inverse of the first order.

13. The apparatus of claim 12, further comprising external storage for storing at least one of the intermediary blocks.

14. The apparatus of claim 13, wherein the processor storage is local to the processor, and the external storage is remote from the processor.

15. The apparatus of claim 12, wherein at least a last block written to a memory in the first order is equivalent to at least a first block read from memory in the second order.

16. A non-transitory computer-readable storage medium comprising a set of computer-readable instructions stored thereon, which when executed by at least one processor, cause the at least one processor to:
apply a partitioning scheme to the input data, to partition the input data into a plurality of blocks, each block representing a portion of the input data;
process, at the first layer of the neural network, the blocks of the input data in a first order to generate intermediary data, wherein the intermediary data is partitioned into a plurality of intermediary blocks by applying an intermediary partitioning scheme to the intermediary data, such that the intermediary data is partitioned into a plurality of intermediary blocks in accordance with the intermediary partitioning scheme, and wherein the intermediary partitioning scheme is based on an optimal intermediary block size; and
process, at the second layer of the neural network, the intermediary blocks in a second order, wherein the second order is the inverse of the first order.

* * * * *